United States Patent [19]

Couvillion

[11] Patent Number: 5,123,692
[45] Date of Patent: Jun. 23, 1992

[54] TRUCK TAILGATE RETRACTABLE TO A LOCKED POSITION BENEATH THE TRUCK BED

[76] Inventor: Charles C. Couvillion, 5 Lansdowne La., Destrehan, La. 70047

[21] Appl. No.: 708,179

[22] Filed: May 31, 1991

[51] Int. Cl.⁵ .............................................. B62D 33/02
[52] U.S. Cl. ................................. 296/57.1; 296/180.1
[58] Field of Search ...................... 296/57.1, 61, 62, 50; 280/166

[56] References Cited

U.S. PATENT DOCUMENTS

| | | | |
|---|---|---|---|
| 2,659,902 | 11/1953 | Fitzgerald et al. | 296/57.1 X |
| 4,171,844 | 10/1979 | Landaal et al. | 296/57.1 |
| 4,580,828 | 4/1986 | Jones | 296/57.1 |

*Primary Examiner*—Robert R. Song
*Attorney, Agent, or Firm*—Pravel, Gambrell, Hewitt, Kimball & Krieger

[57] ABSTRACT

What is provided is a tailgate storable beneath a truck bed, which includes a tailgate body, defining the rear wall of the truck bed; an axle for allowing the tailgate body to move from a first upright, vertical position, to a second, horizontal position; a pair of tracks secured beneath the truck bed, and extending rearward to accommodate the movement of the tailgate body; roller members secured to the ends of the axle means, and rollable within the tracks, so that when the tailgate body is moved to the second, horizontal position, the tailgate body may be slidably moved to a position beneath the truck bed, as the roller members roll within the tracks; a rod member extending across the length of the tailgate body for supporting the tailgate body when the body has been moved to the second, horizontal position; a channel formed in the wall of the tailgate member for engaging the rod member when the rod member supports the tailgate in the horizontal position; and a locking for locking the tailgate body in position beneath the bed of the truck, when the tailgate body has been moved to the second, horizontal position beneath the truck bed.

9 Claims, 4 Drawing Sheets

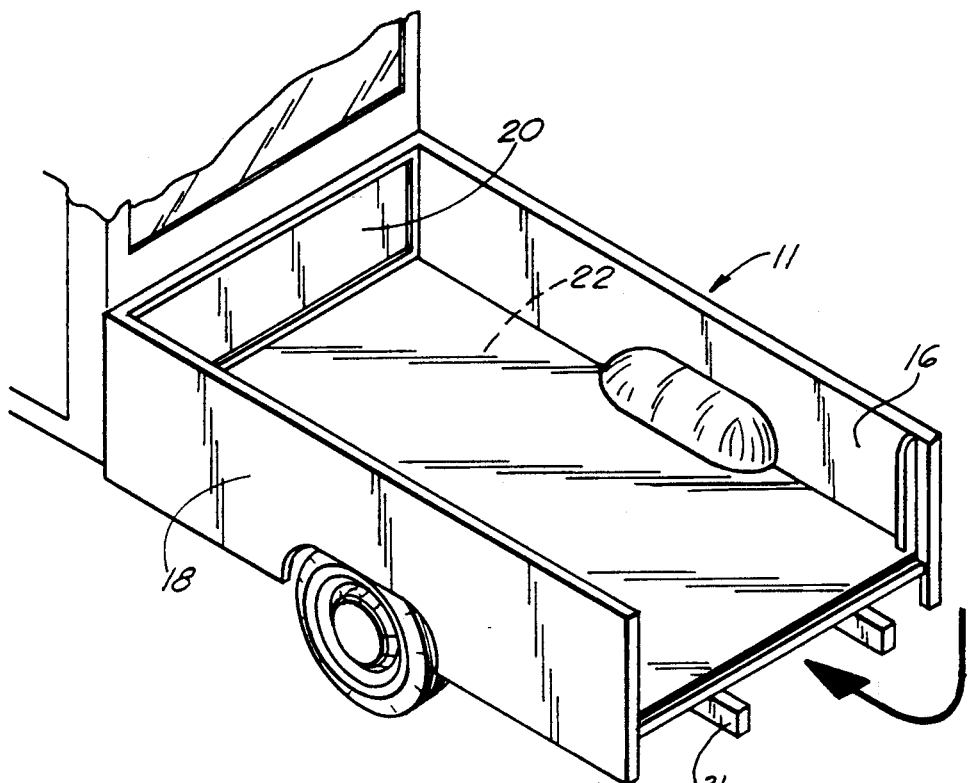
FIG. 1A
FIG. 1
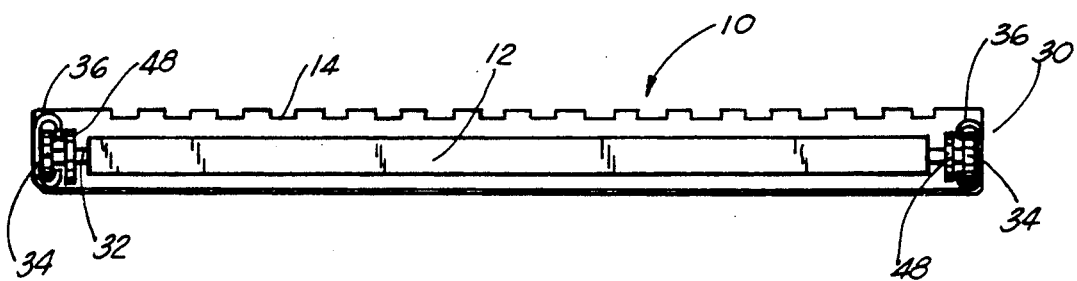
FIG. 2

TRUCK TAILGATE RETRACTABLE TO A LOCKED POSITION BENEATH THE TRUCK BED

BACKGROUND OF THE INVENTION

1. Field Of The Invention

The present invention relates to trucks. More particularly, the present invention relates to a tailgate which would be movable from a first closed position against the side walls of the truck for defining an enclosed bed therein, to a second position wherein the tailgate is slidably movable to a position beneath the bed and locked in place while not in use.

2. General Background

In general, pickup trucks, of the type having a rear enclosed bed are provided with a rear tailgate which is movable from a first upright locked position to a second open position wherein the tailgate is substantially horizontally aligned with the bed of the truck. During the operation of such a pickup, particularly when the truck is not carrying any materials within the bed portion, the conventional tailgate is often left in the position, so as to reduce drag as the truck moves along the highway. The leaving of the tailgate in the open position can be somewhat hazardous in that it projects from the rear of the truck which may result in contact with individuals or other vehicles, thus causing damage or injury.

One of the current options that allows the rear wall of the bed to be maintained open without having the tailgate laid horizontal, is to remove the tailgate, and secure a netting across the rear opening in place of the tailgate which, creates less drag, and furthermore serves as a means for maintaining items within the bed of the truck during transport. However, there is still an ongoing need for having a solid inflexible tailgate that may be locked into the upright vertical position for totally enclosing the bed of the truck during transport of particular items, where a flexible net is inappropriate. The problem involved in interchanging the rear wall from a solid tailgate to a flexible net is quite impractical, and does not solve the problem in the art.

Several patents have been located in a patentability search, which are pertinent to the subject matter of the present invention, the most pertinent being as follows:

| INVENTOR | TITLE | ISSUE DATE |
| --- | --- | --- |
| Nordberg | Turnable Truck Gate | 08/31/76 |
| Olins | Locking Tail-Gate Assembly | 07/16/85 |
| Hill | Linkage For Hinged Tailgates | 08/09/77 |
| Herrington | Improvements in Chocks or Stops for Vehicles | 07/27/60 |
| French Patent No. 2.025.264 | AB Hydro-Lift | 09/04/70 |

SUMMARY OF THE PRESENT INVENTION

The apparatus of the present invention solves the problems in the art in a simple and straight forward manner. What is provided is a solid frame tailgate hingedly attached to the rear of the truck walls, for moving from a first upright closed position to a second horizontal open position. The tailgate is further provided with a plurality of metal rollers positioned on an axle secured along the length of the tailgate, with the metal rollers riding in a track engaged along each side wall of the truck bed beneath the bed. Once positioned in the lower position, the rollers are able to slide along the track and move the tailgate to a position beneath the floor of the truck bed, and once in position to be locked in place so as to avoid movement of the tailgate while it is in the open and stored away position. The tailgate would simply be rolled from storage and hingedly restored to the upright position when one chose to restore the closed configuration of the truck bed.

It is therefore a principal object of the present invention to provide a tailgate for a pickup truck or the like, which enables the tailgate to be moved to the open position and retracted beneath the bed of the truck when not in use;

It is the further principal object of the present invention to provide a tailgate to a pickup truck which is slidably engagable beneath the bed of the truck, and thus provides an open bed truck, eliminating the hazard of an open tailgate extending outward therefrom;

It is still a further object of the present invention to provide a tailgate which may be slidably moved to a position beneath the bed of a truck and locked in place thus allowing the rear of the truck to be open and to reduce drag from the air during movement of the truck;

It is the further object of the present invention to provide a simple and inexpensive system for allowing the tailgate of a truck while in the open position to be stored beneath the bed of the truck and locked in place so as to allow an open rear end of the truck bed, yet to maintain the tailgate out of sight and away from possible contact with other vehicles or individuals.

BRIEF DESCRIPTION OF THE DRAWINGS:

For a further understanding of the nature and objects of the present invention, reference should be had to the following detailed description taken in conjunction with the accompanying drawings, in which like parts are given like reference numerals, and wherein:

FIG. 1 illustrates an overall view of a pickup truck bed which has incorporated the present invention;

FIG. 1A illustrates a side view of the pickup truck bed utilizing the present invention;

FIG. 2 illustrates an end view of the apparatus of the present invention in the stored position;

DETAILED DESCRIPTION OF THE PREFERRED EMBODIMENT

Figure 7:
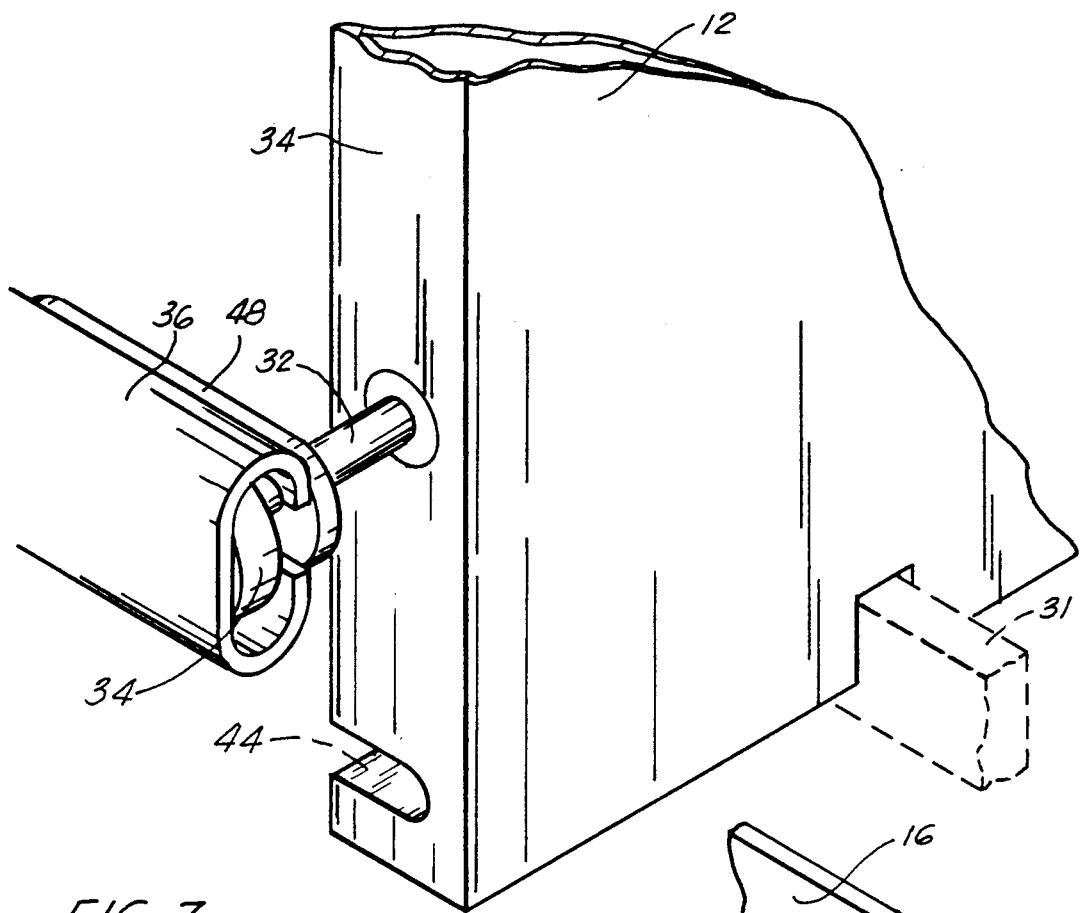
FIG. 7 illustrates the tracking system when the tailgate is in the closed position.

The preferred embodiment of the apparatus of the present invention is illustrated in FIGS. 2 through 7 by the numeral 10. As illustrated in the figures, apparatus 10 comprises a moveable tailgate member 12, which would be constructed of a light-weight steel to prevent rusting, or the like, positioned along the rear of a truck bed. As seen in FIG. 1, apparatus 10 is positioned on a standard pickup truck, or the like, which would further comprise a generally rectangular bed or floor 14, a pair of upright sidewalls 16, 18 and front wall 20, and the tailgate 12 as the rear wall. When tailgate 12 is in the upright closed position, the tailgate 12 would provide, together with sidewalls 16, 18 and forward wall 20, an enclosed space 22, wherein goods may be placed during transport by the pickup truck 11.

The apparatus 10 of the present invention would provide a means for moving the tailgate 12 from a first upright position, as previously described, to a second lowered, horizontal position, wherein the tailgate could be slidably stored beneath the bed or floor 14 of truck 11, as illustrated in FIGS. 1 and 2.

FIG. 2 illustrates an end view of tailgate 12 in the storage position, beneath truck bed 14, and locked in place by tracking mechanism 30, as will be fully described. As seen in FIGS 1 and 2, the tailgate 12 would be fully stored beneath bed 14, so that the top edge 17 of tailgate 12 is flush with the rear end point 15 of bed 14. For purposes of proper fit, when in the upright position, FIG. 1A illustrates that the end of bed 14 is beveled to the point 15 for accommodating tailgate 12 in the upright position.

Figure 3:
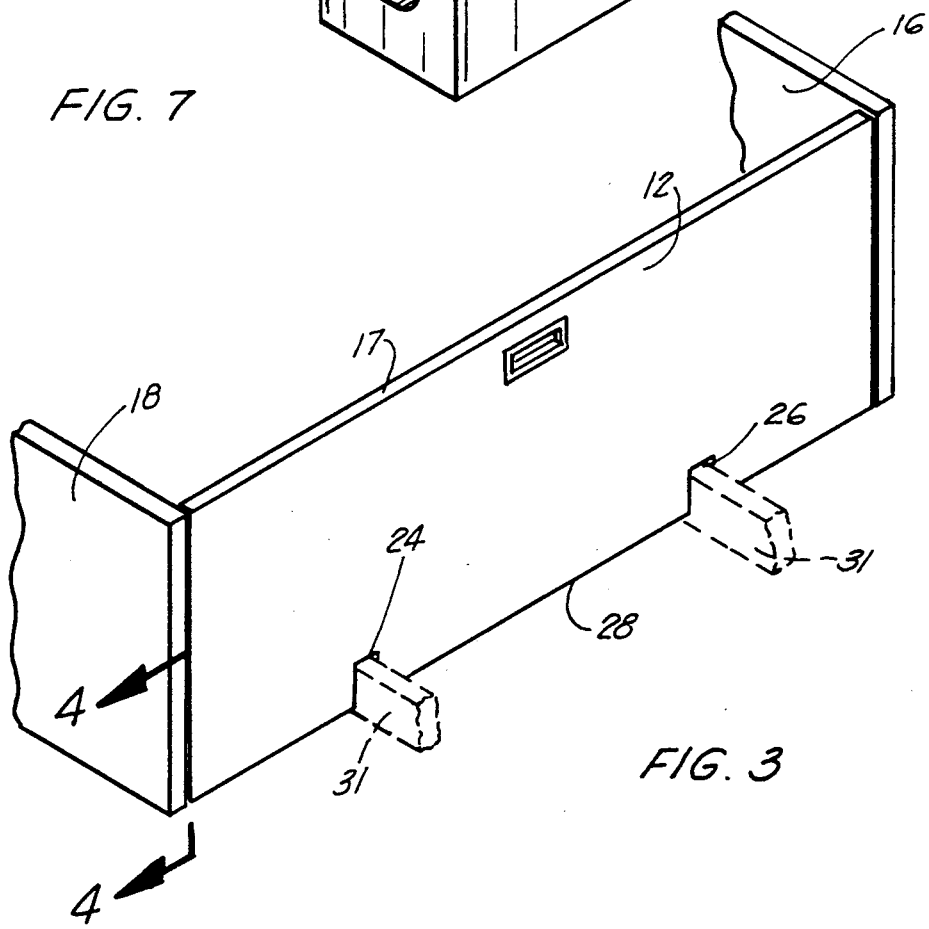
FIG. 3 illustrates the tailgate of the present invention in the closed position.

Turning now to the operation of the tailgate 12 as it moves between the stored position in FIGS. 1 and 2, to the upright position as seen in FIG. 3, reference is made to FIGS. 3 through 7. As seen in FIG. 3, tailgate 12 is in the upright position, with the top edge 17 of tailgate 12 in alignment with the top edge of walls 16, 18. As illustrated, tailgate 12 has a pair of slots 24, 26 along its bottom edge 28 for accommodating the longitudinal frame members 31 protruding from the rear of bed 14 as illustrated.

Figure 4:
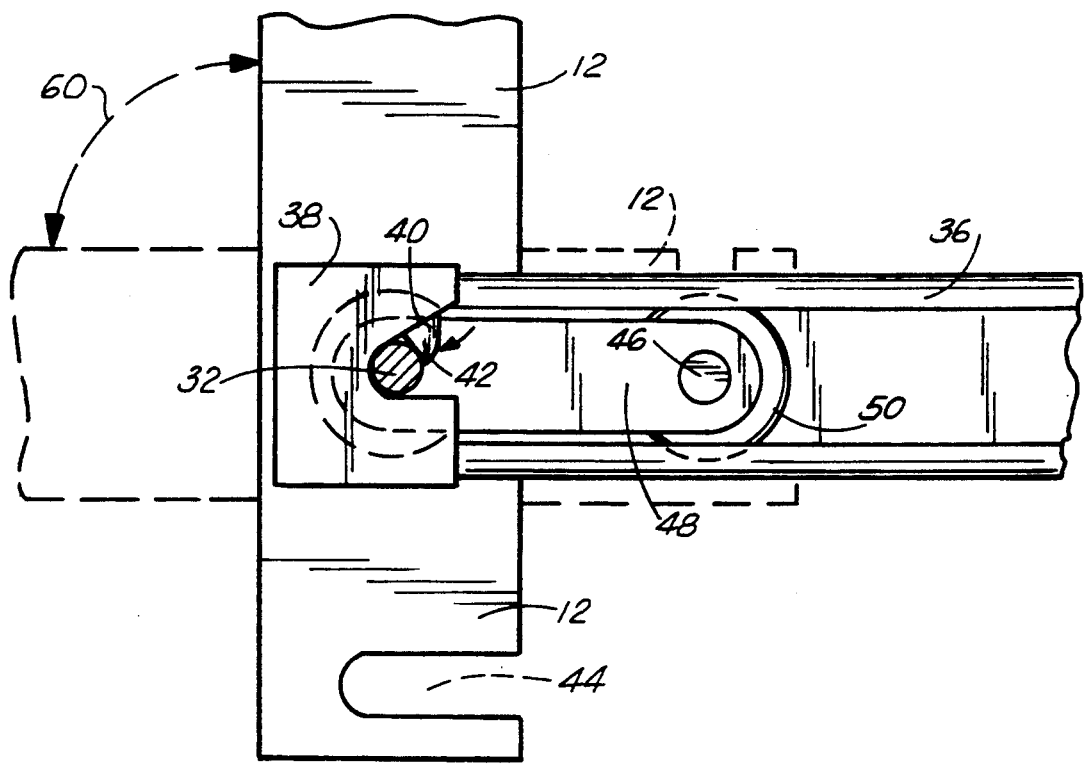
FIG. 4 illustrates a view along lines 4—4 of FIG. 3 of the tailgate in the closed position.
Figure 5:
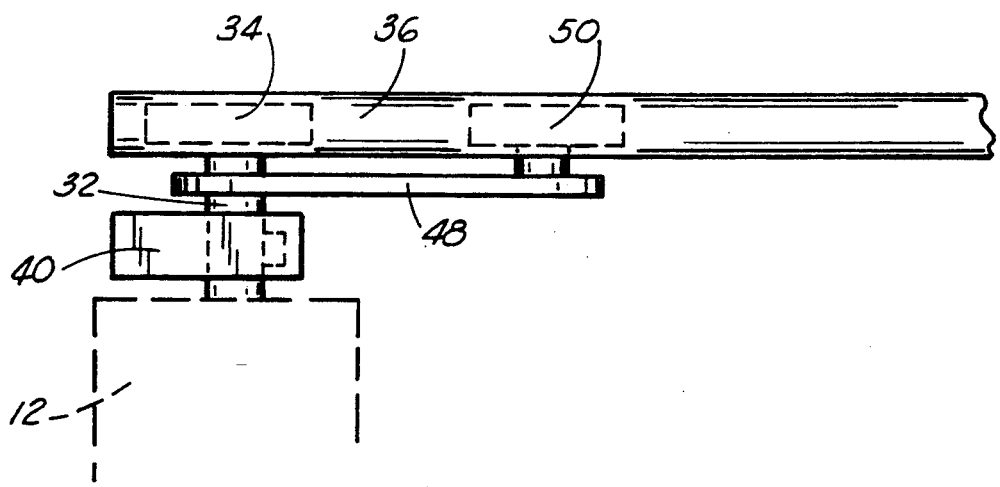
FIG. 5 illustrates a top view of the tailgate in a closed position.

Turning to FIG. 4, which is a view along lines 4—4 in FIG. 3, and FIGS. 5 and 7, there is illustrated the mechanism for allowing the tailgate 12 to move as discussed. As illustrated, tailgate 12, in the upright position, includes a first axle member 32 extending through the length of tailgate 12, and protruding out from each side edge 34 of tailgate 12, as illustrated in FIG. 7. The axle 32 enables the tailgate to move between up and down positions during operation. Each end of axle 32 has rotatably secured thereto a wheel 34, with each wheel engaged within a track 36, as illustrated. Each track 36 would be positioned beneath the bed 14 of truck 11, and would be fixedly secured to the wall of the bed, beneath the bed, as illustrated in FIG. 2.

As seen in FIG. 4, at the rearrest most end of each track 36 there is provided a stop means 38, which would seal off the end of the channel to prevent the tailgate 12 from sliding completely out of tracks 36 during operation. Further, each stop means 38 further provides a locking member 40, which comprises a retractable tooth portion 42, which engages the body of axle 32 to secure it in place when the tailgate 12 is in the upright position as illustrated.

Figure 6:
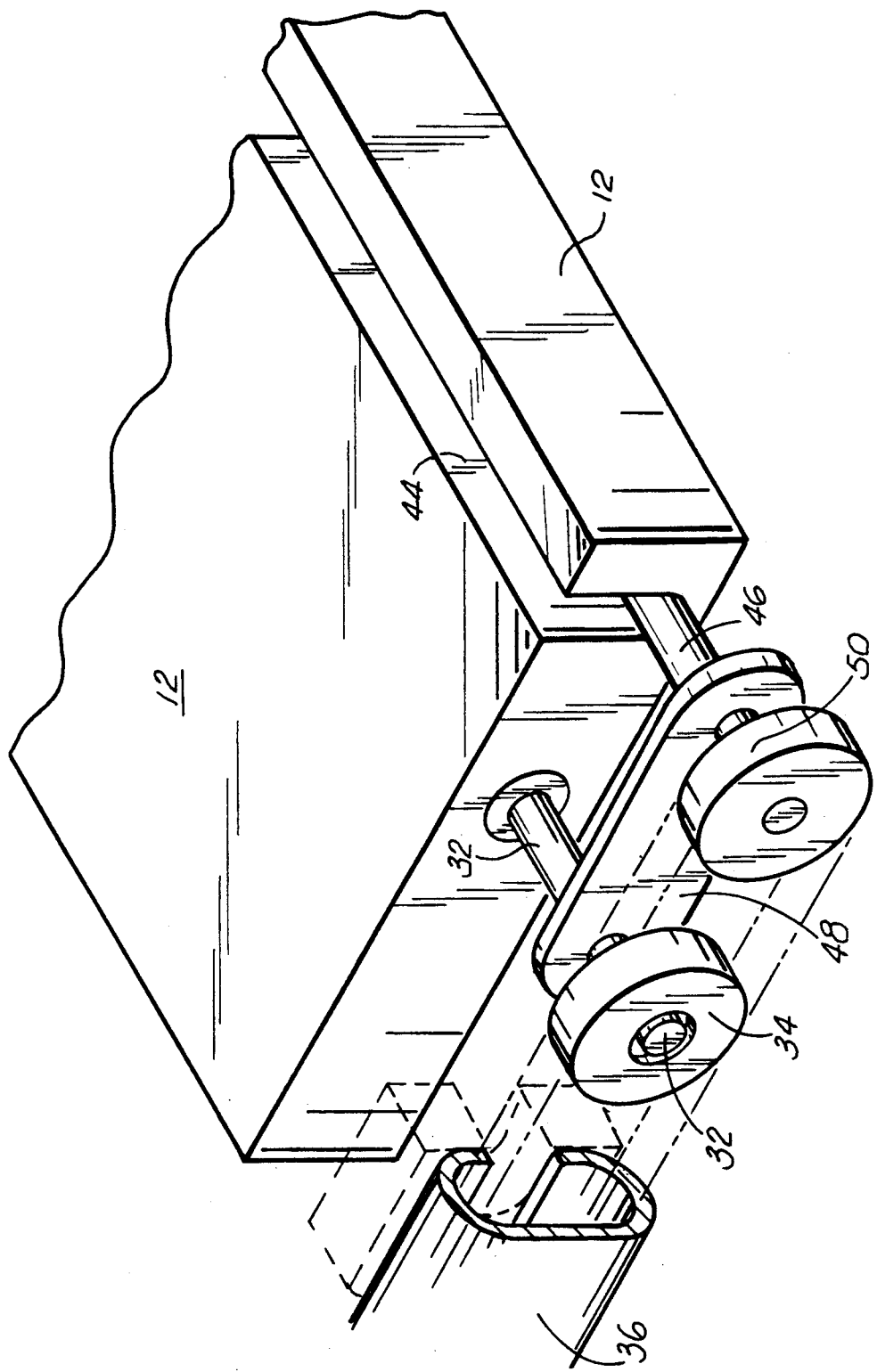
FIG. 6 illustrates a partial view of the tracking system involved when the tailgate is in the open position.

As further illustrated in FIG. 4, when the tailgate is in the upright position, there is clearly identified a channel 44 formed in the lower edge of tailgate 12. This channel 44 provides a means for maintaining tailgate 12 in the flat, horizontal position, when it is being stored beneath bed 14. This means works in cooperation with a second rod member 46, which, also, extends across the width of bed 14, and would be positioned within channel 44, when tailgate 12 is in the open position, as illustrated in FIG. 6. As seen in the FIGURES, the ends of rod 46 is provided with a rotatable wheel 50, with wheel 50 in the same alignment with wheel 34, which together would travel within tracks 36, as the tailgate is slid beneath the truck bed 14. Second rod member 46 is maintained in position via a linkage member 48, positioned and extending from the first axle 32 to the second rod 46, on either side of tailgate 12, as to maintain the axle 32 and the rod 46 properly spaced apart. In this manner, when tailgate 12 is lowered to the full horizontal position, rod member 46 rests within channel 44, along the entire length of tailgate 12, and is firmly held in place, either while serving as a lowered tailgate behind the bed, or when the tailgate is slid along tracks 36 to be stored beneath the bed 14.

FIG. 4 further illustrates the movement of the tailgate 12 from the fully upright position, to the fully open position, by the arrow 60, and when in the fully open position (in phantom view), the positioning of the rod 46 resting in channel 44, and the axle 32 locked via locking means 40, so that when the tailgate is moved to the storage position, as illustrated in FIG. 6, the tailgate does not move around, or worst yet, come sliding out from storage, until the locking means 40 is disengaged, and the tailgate 12 is manually removed.

As seen in FIG. 7, when the tailgate 12 has been moved to the upright position, it is held in that position via axle 32, and rollers 34 secured within storage tracks 36 along each side wall 16, 18 of the truck 11, beneath bed 12. In this position, the lower most channel 44 is disengaged from rod 46, and is supported wholly by axle 32. Of course, as stated earlier, when the tailgate 12 is lowered, then the axle and rod combination secure it within tracks 36, and it may be slid into storage and locked in place.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A tailgate storable beneath a truck bed, comprising:
   a) a tailgate body, defining the rear wall of the truck bed;
   b) axle means for allowing the tailgate body to move from a first upright, vertical position, to a second, horizontal position;
   c) a pair of tracks secured beneath the truck bed, and extending rearward to accommodate the movement of the tailgate body;
   d) roller members secured to the ends of the axle means, and rollable within the tracks, so that when the tailgate body is moved to the second, horizontal position, the tailgate body may be slidably moved to a position beneath the truck bed, as the roller members roll with the tracks and
   e) a rod member slidably mounted on and extending between the pair of tracks for supporting the tailgate body in its second horizontal position.

2. The apparatus in claim 1, wherein the rod member also provides a roller member at each end thereof, each roller member rollable with the tracks secured to the side of the truck bed walls.

3. The apparatus in claim 1, wherein there is further provided locking means for securing the tailgate in the vertical or horizontal positions.

4. The apparatus of claim 1, wherein the rod member is secured in parallel relationship to the axle member via a pair of linking elements at both ends of the rod member.

5. The apparatus of claim 1 wherein there is further provided a channel formed in the wall of the tailgate member for supporting the rod member when the rod member supports the tailgate in the horizontal position.

6. A tailgate storable beneath a truck bed, comprising:
a) a tailgate body, defining the rear wall of the truck bed;
b) axle means for allowing the tailgate body to move from a first upright, vertical position, to a second, horizontal position;
c) a pair of tracks secured beneath the truck bed, and extending rearward to accommodate the movement of the tailgate body;
d) roller members secured to the ends of the axle means, and rollable within the tracks so that when the tailgate body is moved to the second, horizontal position, the tailgate body may be slidably moved to a position beneath the truck bed, as the roller members roll within the tracks; and
e) a rod member slidably mounted on and extending between the pair of tracks for supporting the tailgate body in its second horizontal position.

7. The apparatus of claim 6, wherein there is further provided a channel formed in the wall of the tailgate member for supporting the rod member when the rod member helps to support the tailgate in the horizontal position.

8. The apparatus of claim 7, wherein the rod member is secured in parallel relationship to the axle member via a pair of linking elements at both ends of the rod member.

9. A tailgate storable beneath a truck bed, comprising:
a) a tailgate body, defining the rear wall of the truck bed;
b) axle means for allowing the tailgate body to move from a first upright, vertical position, to a second, horizontal position;
c) a pair of tracks secured beneath the truck bed, and extending rearward to accommodate the movement of the tailgate body;
d) roller members secured to the ends of the axle means, and rollable within the tracks so that when the tailgate body is moved to the second, horizontal position, the tailgate body may be slidably moved to a position beneath the truck bed, as the roller members roll within the tracks;
e) a rod member slidably mounted on and extending between the pair of tracks for supporting the tailgate body in its second horizontal position;
f) a channel formed in the wall of the tailgate member for engaging the rod member when the rod member supports the tailgate in the horizontal position; and
g) locking means for locking the tailgate body in position beneath the bed of the truck, when the tailgate body has been moved to the second, horizontal position beneath the truck bed.

* * * * *